United States Patent [19]
Sundquist et al.

[11] Patent Number: 5,918,987
[45] Date of Patent: Jul. 6, 1999

[54] THRUST BEARING ASSEMBLY WITH WASHER

[75] Inventors: Steven E. Sundquist, New Hartford; Leo M. Reubelt, Torrington, both of Conn.

[73] Assignee: The Torrington Company, Torrington, Conn.

[21] Appl. No.: 09/028,337

[22] Filed: Feb. 24, 1998

[51] Int. Cl.[6] .................................................. F16C 19/30
[52] U.S. Cl. ......................... 384/622; 384/618; 384/620
[58] Field of Search .................................. 384/618, 620, 384/621, 622

[56] References Cited

U.S. PATENT DOCUMENTS

| | | | |
|---|---|---|---|
| 3,365,040 | 1/1968 | Pitner ................................... | 384/618 X |
| 3,972,574 | 8/1976 | Pitner ..................................... | 384/621 |
| 4,042,285 | 8/1977 | Dorsch .................................. | 384/621 |
| 4,696,588 | 9/1987 | Tanaka et al. ......................... | 384/615 |
| 4,725,153 | 2/1988 | Tsuruki ................................. | 384/620 |
| 4,733,979 | 3/1988 | Tsuruki ................................. | 384/620 |
| 4,883,374 | 11/1989 | Rhoads et al. ......................... | 384/618 |
| 4,915,512 | 4/1990 | Hilby et al. ......................... | 384/622 X |
| 5,110,223 | 5/1992 | Koch et al. ............................ | 384/620 |
| 5,158,375 | 10/1992 | Uchida et al. ......................... | 384/455 |
| 5,489,255 | 2/1996 | Hinckley et al. ...................... | 384/620 |
| 5,529,400 | 6/1996 | Polinsky et al. .................... | 384/620 X |

Primary Examiner—Thomas R. Hannon
Attorney, Agent, or Firm—John C. Bigler

[57] ABSTRACT

Rollers are positioned between first and second thrust washers and in contact with first and second raceways. The rollers being held within a cage that is mechanically retained by axially directed lips of the thrust washers. A third thrust washer is positioned against an axially outward surface of the second thrust washer and extends radially outwardly of the second raceway. The third thrust washer has a resilient retention tab extending through at least two slots of the second thrust washer that are located radially outwardly from the second raceway, such that the third thrust washer is mechanically secured to the second thrust washer by a snap-together assembly.

5 Claims, 2 Drawing Sheets

THRUST BEARING ASSEMBLY WITH WASHER

BACKGROUND OF THE INVENTION

This invention relates generally to thrust bearings and, more particularly, to a thrust bearing assembly having a non-raceway washer attached to the other elements.

In some applications, it is desirable to provide an additional thrust surface, located radially outwardly of a thrust bearing. For example, where a rolling element thrust bearing is used in an automobile transmission between a shaft and a housing, there may be a need for a thrust surface to engage a clutch retainer or other transmission member that has a greater diameter than the thrust surfaces of the shaft and housing. To maintain a compact transmission package, and to facilitate installation, it would be desirable to have a single thrust bearing assembly that would provide a suitable thrust surface for the clutch retainer (or other similar member) with a thrust bearing and, thereby, provide both functions.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a thrust bearing assembly comprising a first thrust washer having a radially outer lip directed axially inwardly from a first raceway, a second thrust washer having a radially inner lip directed axially inwardly from a second raceway, and a plurality of rollers between the first and second thrust washers in contact with the first and second raceways, the rollers being held within a cage mechanically retained by the lips of the thrust washers. A third thrust washer is positioned against an axially outward surface of the second thrust washer, extending radially outwardly of the second raceway, and has a resilient retention tab extending through at least two slots of the second thrust washer located radially outwardly from the second raceway, such that the third thrust washer is mechanically secured to the second thrust washer by a snap-together assembly.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
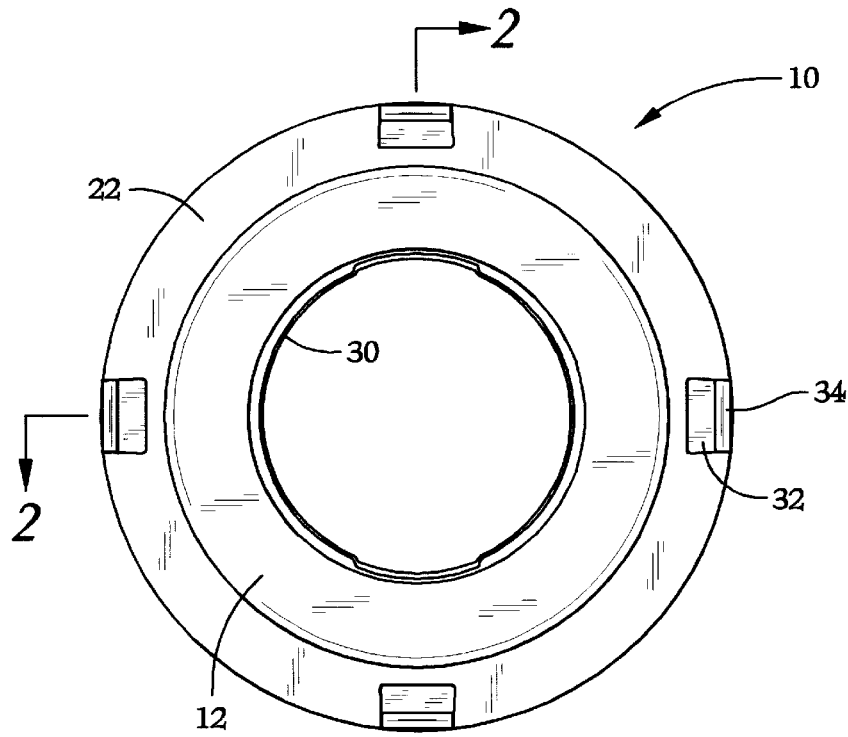
FIG. 1 is an end view illustrating an embodiment of the thrust bearing assembly of the present invention.
Figure 2:
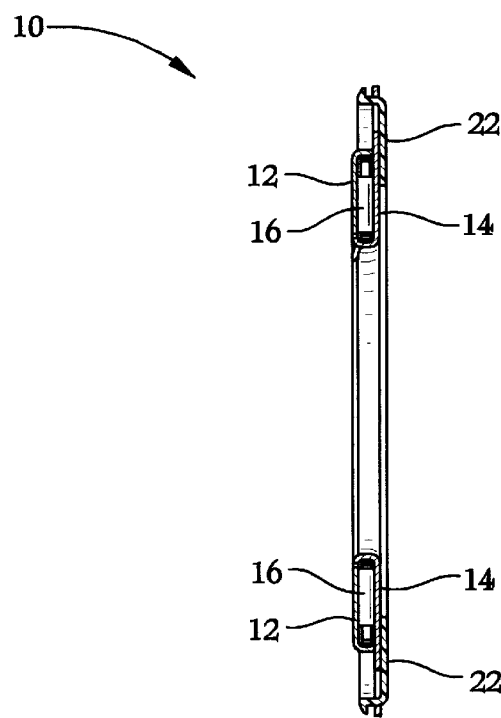
FIG. 2 is a cross-sectional view of the embodiment of FIG. 1, taken along the line 2—2.
Figure 3:
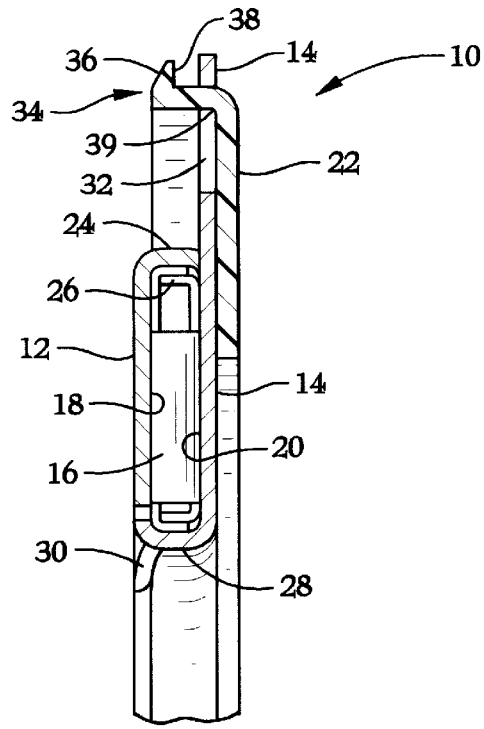
FIG. 3 is an enlarged view of a portion of the preferred embodiment as shown in FIG. 2.

Referring now to the drawings, FIGS. 1 through 3 illustrate is thrust bearing assembly 10 having a first thrust washer 12, a second thrust washer 14, and a plurality of rollers 16 therebetween, in rolling contact with first and second raceways 18 and 20 of the first and second thrust washers, respectively. A third thrust washer 22 is positioned against an axially outward surface of the second thrust washer 14.

The first thrust washer 12 has a radially outer lip 24, that is, lip 24 is located at the outer diameter of first thrust washer 12. Radially outer lip 24 is directed axially inwardly and wraps around a cage 26 retaining rollers 16 to secure the caged rollers and first thrust washer 12 together. The second thrust washer 14 has a radially inner lip 28 directed axially inwardly and wrapping around cage 26 to secure the caged rollers and second thrust washer 14 together. The first thrust washer 12 may include an optional radially inwardly directed lip 30 to snap into a groove of a shaft, not shown.

The second thrust washer 14 has at least two slots 32 located radially outwardly of the second raceway 20. The third thrust washer 22 extends radially outwardly of the second raceway for engagement with a clutch retainer or other member separate from the housing that receives second thrust washer 14. The third thrust washer 22 includes resilient retention tabs 34 that extend axially inwardly through the slots 32 such that the third thrust washer is mechanically secured to the second thrust washer 14 by a snap-together assembly.

Although other configurations may be used, the retention tabs 34 of the illustrated embodiment have a barb-like shape with an angled deflection surface 36 for engaging a radially outer edge of slots 32 such that the retention tabs are resiliently deflected radially inwardly when the third thrust washer is moved axially toward the second thrust washer 14 to effect assembly. After assembly, the retention tabs 34 snap radially outwardly such that a locking surface 38 prevents inadvertent removal of the third thrust washer 22 after assembly, by engaging the second thrust washer 14. Alternatively, the retention tabs may have barbs extending radially inwardly or may have other known configurations for mechanical snap-together assembly.

The third thrust washer 22 may be conveniently molded of a suitable plastic or may be formed of various metals or other materials having suitable lubricity. A preferred material is polyetheretherketone (PEEK), which has a suitable lubricity for sliding engagement with a clutch retainer or similar component.

The third thrust washer 22, if plastic, can be molded in an axial draw tool and using standard tooling tolerances and practices. Because the third thrust washer 22 is piloted from the radially outer surfaces of the slots 32, and because of the wide width of slots 32, the third thrust washer 22 may be formed with an inside corner radius 39 or bevel along its outer diameter while still maintaining a flat position against the second thrust washer 14 and the clutch retainer or other component in the application. The wide width of slots 32 also facilitates tooling for punching the slots 32 within the second thrust washer 14.

Figure 4:
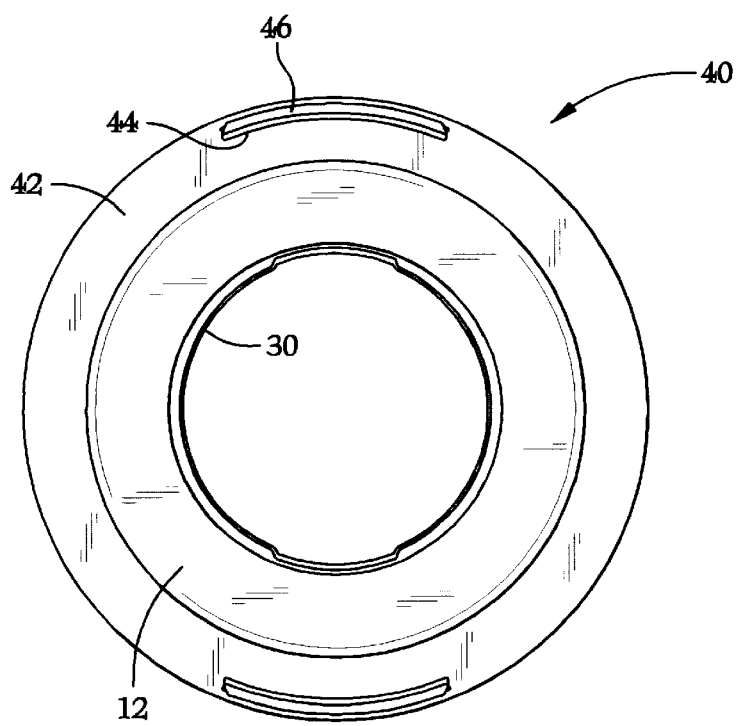
FIG. 4 is an end view illustrating a second embodiment of the thrust bearing assembly of the present invention.

FIG. 4 illustrates thrust bearing assembly 40, a second embodiment of the present invention having a second thrust washer 42 with two slots 44 that are arcuate rather than rectangular, unlike slots 32. Resilient retention tabs 46 are similar to retention tabs 34 but are arcuate in shape to correspond to the slots 44. The remaining elements of thrust bearing assembly 40 are identical to those of thrust bearing assembly 10 and are indicated with numerals corresponding to those of the earlier-described embodiment.

The present invention provides an attachment of a separate non-raceway washer (third thrust washer) to the raceway element (second thrust washer) of a thrust bearing. The connection feature is within a non-raceway portion of that element such that the non-raceway washer can be snapped in place through annular slots in the raceway element. The connection feature may include a lead chamfer that pilots and deforms a tab for easy assembly. Once installed, a ridge (locking surface) springs back to its original diameter to lock the added washer in place and prevent rotation relative to the raceway element.

Having described the invention, what is claimed is:

1. A thrust bearing assembly comprising:
   a first thrust washer having a radially outer lip directed axially inwardly from a first raceway;
   a second thrust washer having a radially inner lip directed axially inwardly from a second raceway, the second thrust washer having at least two slots located radially outwardly from the second raceway;
   a plurality of rollers between the first and second thrust washers in contact with the first and second raceways, the rollers being held within a cage mechanically retained by the lips of the thrust washers; and
   a third thrust washer positioned against an axially outward surface of the second thrust washer, extending radially outwardly of the second raceway, and having a resilient retention tab extending through each of the slots of the second thrust washer such that the third thrust washer is mechanically secured to the second thrust washer by a snap-together assembly.

2. The thrust bearing assembly accordingly to claim 1, wherein the retention tab includes a deflection surface for resiliently deforming the retention tab radially during assembly and a locking surface for engaging the second thrust washer to retain the third thrust washer after assembly.

3. The thrust bearing assembly accordingly to claim 2, wherein the retention tab is deformed radially inwardly during assembly and is deformed radially outwardly after assembly such that the locking surface engages the second thrust washer.

4. The thrust bearing assembly accordingly to claim 1, wherein the third thrust washer is made of plastic.

5. The thrust bearing assembly accordingly to claim 1, wherein the number of slots in the second thrust washer is four.

* * * * *